United States Patent
Komatsu et al.

[11] Patent Number: 6,094,324
[45] Date of Patent: Jul. 25, 2000

[54] DISK DRIVE WITH CHASSIS OPENING FOR RECEIVING DISK MOUNTING PORTION OF MOTOR DRIVE CONE

[75] Inventors: Hisateru Komatsu, Tendo; Makoto Takahashi, Obanazawa, both of Japan

[73] Assignee: Mitsumi Electric Co., Ltd., Tokyo, Japan

[21] Appl. No.: 09/223,425

[22] Filed: Dec. 30, 1998

[30] Foreign Application Priority Data

Jan. 8, 1998 [JP] Japan .................................. 10-001988

[51] Int. Cl.[7] ...................................................... G11B 5/016
[52] U.S. Cl. ..................................... 360/99.01; 360/99.04
[58] Field of Search ............................. 360/99.01, 99.05, 360/98.07, 98.08, 99.08, 99.12

[56] References Cited

U.S. PATENT DOCUMENTS 5,572,383  11/1996  Hoshi .................................... 360/99.05

FOREIGN PATENT DOCUMENTS 9-91814  4/1997  Japan .
9-91866  4/1997  Japan .
9-91943  4/1997  Japan .

Primary Examiner—A. J. Heinz
Attorney, Agent, or Firm—Frishauf, Holtz, Goodman, Langer & Chick, P.C.

[57] ABSTRACT

A motor 40 for rotation driving a magnetic disk is comprised of a rotor 41 and a stator 42 assembled with the rotor. The rotor has a central cone 41-11 with a closed top at the center of a casing 41-1, the central cone having a trapezoidal configuration in cross section and being projected upward. A disk table 43 is fixed to the closed top surface of the central cone 41-11. A chassis 30 has an opening 30a formed therein through which only an upper portion of the central cone with the closed top of the rotor is projected towards the major surface. The disk table is thus attached to the back side of the chassis.

3 Claims, 4 Drawing Sheets

DISK DRIVE WITH CHASSIS OPENING FOR RECEIVING DISK MOUNTING PORTION OF MOTOR DRIVE CONE

BACKGROUND OF THE INVENTION

The present invention relates to a disk drive adapted to access a recording medium such as a magnetic disk for recording and reproducing data thereon.

Referring to FIGS. 1 through 3, a conventional magnetic disk drive is described, that is designed for magnetic disks. Such a magnetic disk drive is disclosed in, for example, Japanese Patent Laid-open No. 9-91943. FIG. 1 shows the magnetic disk drive with a reception mechanism for receiving a magnetic disk and an ejection mechanism for ejecting it being omitted for clarity. A chassis 10 comprises side walls 10-1 on both sides thereof. All components and parts are mounted on a major surface of the chassis 10. A main printed wiring board 11 and a sub printed wiring board 20 are fixed by screws to the major surface of the chassis 10. For the main printed wiring board 11, two support members 10-2 (FIG. 2) are formed by cutting and rising a major plate of the chassis 10. The main printed wiring board 10 is fixed to the two support members 10-2 with screws 12.

A stepping motor 13 is attached to a rear wall 10-3 at a rear end of the chassis 10. An output shaft 13-1 of the stepping motor 13 penetrates through the rear wall 10-3. The free end of the output shaft 13-1 is rotatably supported by a shaft receptacle 10-4 formed by means of cutting and rising the major plate of the chassis 10. The output shaft 13-1 has threaded outer peripheral surface. A carriage mechanism 14 is provided with an arm 14-1 having a pin 14-2 embedded therein. The pin 14-2 engages with threads in the output shaft 13-1. Consequently, rotation of the output shaft 13-1 moves the carriage mechanism 14 in the same direction as the output shaft 13-1. The carriage mechanism 14 comprises magnetic heads mounted thereon to access the magnetic disk. The carriage mechanism 14 is for moving the magnetic heads in the radial direction of the magnetic disk.

The carriage mechanism 14 is provided with a bearing arm 14-3 having an U-shape on the opposite side as the arm 14-1. A guide bar 15 penetrates through the bearing arm 14-3. The guide bar 15 is held by a guide bar clamp 16. Consequently, the carriage mechanism 14 is guided by the guide bar 15 when it moves in association with the rotation of the output shaft 13-1. The guide bar clamp 16 is fixed by a screw to a support plate 10-4 (FIG. 2). The support plate 10-4 is formed by cutting and rising the major plate of the chassis 10 and projects upward through a hole formed in the main printed wiring board 11.

In FIG. 3, a motor 21 for rotation driving the magnetic disk and other necessary circuit components (not shown) are mounted on the sub printed wiring board 20 only on the upper surface thereof. To this end, the sub printed wiring board 20 is fixed by the screws 12 (FIG. 1) such that it nearly contacts the major plate of the chassis 10 at the position closer to a slot for the magnetic disk, i.e., to a front bezel.

Configuration of the motor 21 is described in brief. The motor 21 comprises a rotation shaft 21-1, a center metal 21-2, cores 21-3 for a stator, stator coils 21-4, a ring-shaped permanent magnet 21-5, and a circular casing 21-6 attached to the rotation shaft 21-1. The center metal 21-2 is cylindrical and is used as a bearing. Each of the cores 21-3 extends radially from the center. The stator coil 21-4 is wound about an end of the core 21-3. The permanent magnet 21-5 is provided such that it surrounds a series of cores 21-3. The casing 21-6 holds the permanent magnet 21-5. The permanent magnet 21-5 and the casing 21-6 rotate in cooperation with the rotation shaft 21-1. A reference numeral 21-7 depicts an index magnet. The cores 21-3 and the stator coils 21-4 serve as a stator for the motor 21. The permanent magnet 21-5 and the casing 21-6 serve as a rotor for the motor 21. A combination of such stator and rotor is disclosed in, for example, Japanese Patent Laid-open No. 9-91866 and is thus not described herein.

The casing 21-6 has a central cone with a closed top to have a trapezoid configuration in cross section. A flat portion 21-6a at the top of the casing 21-6 is integrally fixed with a disk table 21-8 that is made of plastic magnet. The flat portion 21-6a is provided with an arm 22 on a bottom surface thereof. A drive roller 23 is rotatably mounted on the arm 22. The flat portion 21-6a and the disk table 21-8 have a generally rectangular hole formed therein. The drive roller 23 passes through the holes and projects upward from the disk table 21-8. The magnetic disk contained in the magnetic disk drive is mounted on the disk table 21-8. The drive roller 23 is inserted in and engaged with a hole formed in a hub of the magnetic disk. Consequently, the magnetic disk is rotation driven in response to the rotation of the rotor. The disk table 21-8 is disclosed in, for example, Japanese Patent Laid-open No. 9-91814 and is not described in detail herein.

An eject plate 24 is incorporated over the motor 21 as the ejection mechanism for the magnetic disk. A disk holder unit 25 is also incorporated over the motor 21 as the reception mechanism for the magnetic disk. The eject plate 24 and the disk holder unit 25 are also disclosed in the above-mentioned Japanese Patent Laid-open No. 9-91814 or 9-91943. The chassis 10 is assembled with a cover plate 18 to protect the space inside the chassis 10.

Meanwhile, the motor 21 is incorporated inside, that is, on the major surface of the chassis 10 in the above-mentioned magnetic disk drive. Therefore, magnetic flux generated by the stator coil 21-4 and/or the permanent magnet 21-5 affects the magnetic head and exerts a bad influence on writing and reading of data. In addition, the motor 21 when incorporated inside the chassis 10 occupies a most space of a limited space on the major surface of the chassis 10. This significantly restricts the space for mounting other mechanisms.

In order to contend with the above-mentioned disadvantages, the disk table 21-8 may be separated from the motor 21. However, the chassis 10 then requires a large opening to expose the motor 21 on a back side of the chassis 10. This means reduction of the mechanical strength of the chassis 10.

SUMMARY OF THE INVENTION

Therefore, an object of the present invention is to provide a disk drive in which any influence associated with magnetic flux present outside a motor for rotation driving a disk is eliminated without exposing the motor on the major surface of a chassis.

It is another object of the present invention to provide a disk drive in which a space on the major surface of the chassis is exploited usefully.

It is yet another object of the present invention to provide a disk drive that achieves the above-mentioned objects without any reduction of the mechanical strength of the chassis.

A disk drive according to the present invention comprises a reception mechanism for receiving a disk on which data are recorded; an ejection mechanism for ejecting the disk that has been received; a carriage mechanism having a head unit for use in accessing the disk, the carriage mechanism holding the head unit such that the head unit is movable in a radial direction of the disk; a moving mechanism for moving the carriage mechanism; a disk table for holding and rotation driving the disk; and a drive motor for rotation driving the disk table. The reception mechanism, the ejection mechanism, the carriage mechanism, and the moving mechanism are all incorporated on a major surface of a metal metallic chassis.

According to an aspect of the present invention, the drive motor is comprised of a rotor formed of a circular plate and a stator assembled with the rotor. The rotor has a central cone with a closed top, the central cone with the closed top having a trapezoidal configuration in cross section and being projected upward at the center of the circular plate. A disk table is fixed to the closed top surface of the central cone. The chassis has an opening formed therein through which only an upper portion of the central cone with the closed top is projected towards the major surface. The disk table is projected towards the major surface of the chassis while the stator is mounted on a back side of the chassis.

DESCRIPTION OF THE PREFERRED EMBODIMENT

Figure 1:
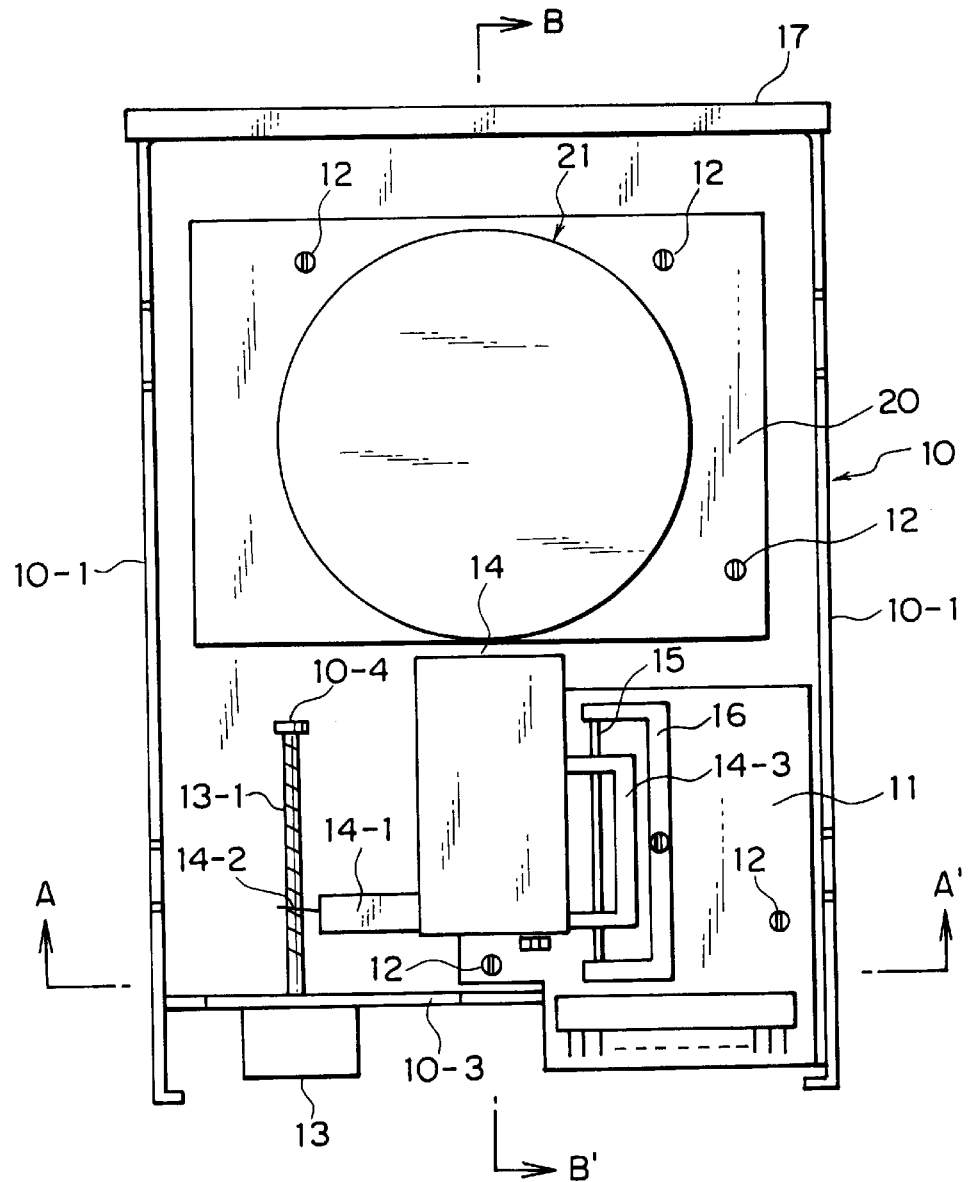
FIG. 1 is a plan view showing inner components and parts of a conventional magnetic disk drive, especially directed to a main printed wiring board, a sub printed wiring board, a carriage mechanism and their peripheral mechanisms.
Figure 2:
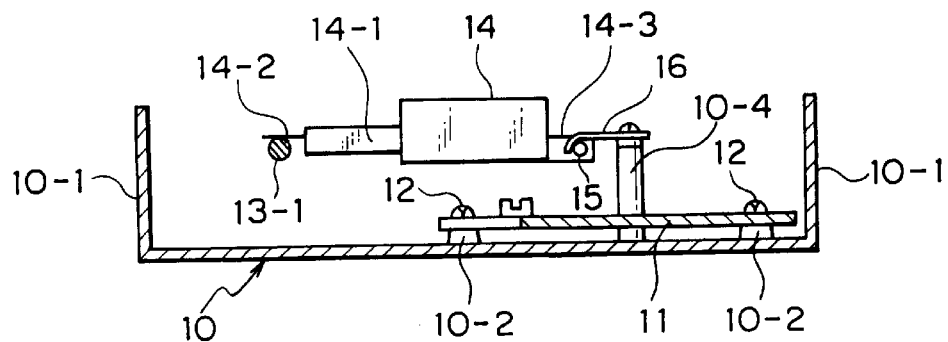
FIG. 2 is a cross sectional view taken on the line A–A' in FIG. 1.
Figure 4:
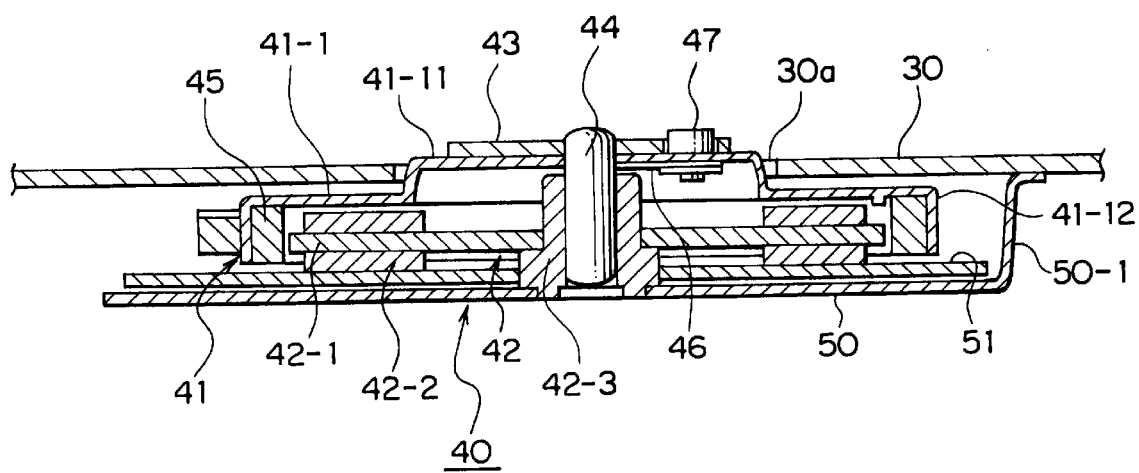
FIG. 4 is a cross sectional view of a magnetic disk drive according to the present invention for use in illustrating the relation between a chassis and a motor assembled with the chassis for rotation driving a magnetic disk.
Figure 5:
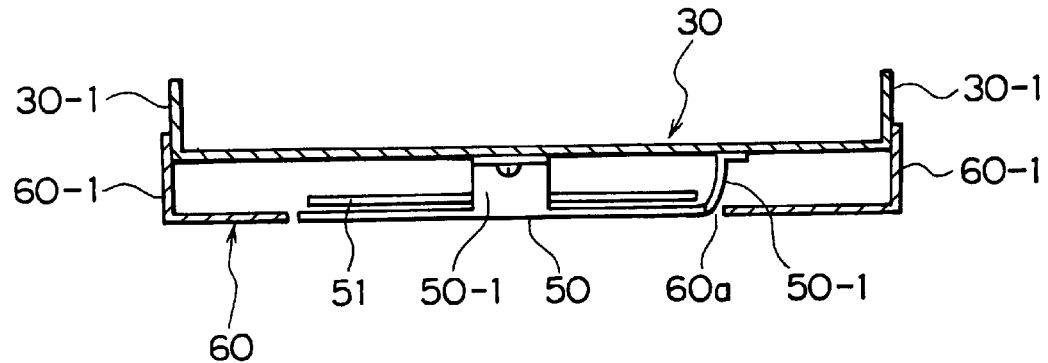
FIG. 5 is a cross sectional view showing from a front side and illustrating the relation among the chassis, a motor base board and a casing in FIG. 4.
Figure 6:
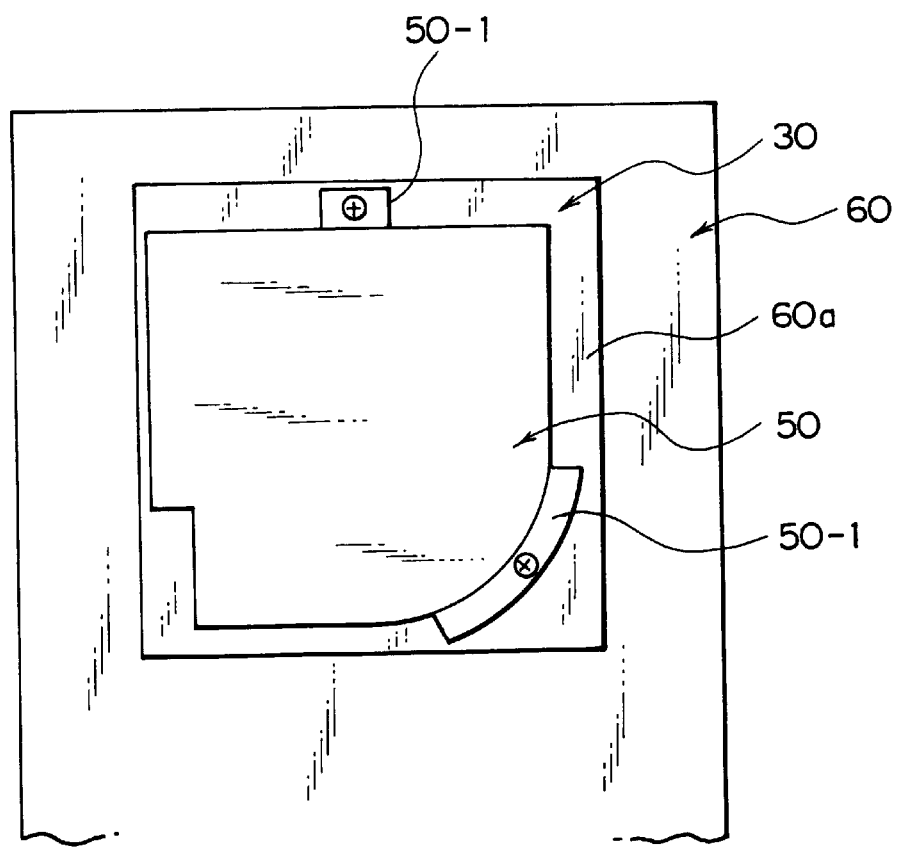
FIG. 6 is a bottom view illustrating the relation among the chassis, a motor base board and a casing in FIG. 4.

Referring to FIGS. 4 through 6, a preferred embodiment is described in which the present invention is applied to a magnetic disk drive similar to the one in FIG. 1. FIG. 4 shows the essentials of the magnetic disk drive, that is, a chassis 30 and a drive motor (hereinafter, merely referred to as a motor) 40 attached to the chassis 30 for rotation driving a magnetic disk.

A major surface, i.e., an upper surface in FIG. 4, of the chassis 30 bears a reception mechanism for receiving a magnetic disk, an ejection mechanism for ejecting the magnetic disk that has been received, a carriage mechanism which has a head unit for use in accessing the magnetic disk and which carries the head unit such that the head unit is movable in a radial direction of the magnetic disk, and a moving mechanism for moving the carriage mechanism. These components are well known in the art and are not described herein. In other words, a feature of this embodiment lies in installation of the motor 40 in the chassis 30. Other configurations are basically similar to those available in the conventional disk drive.

Figure 3:
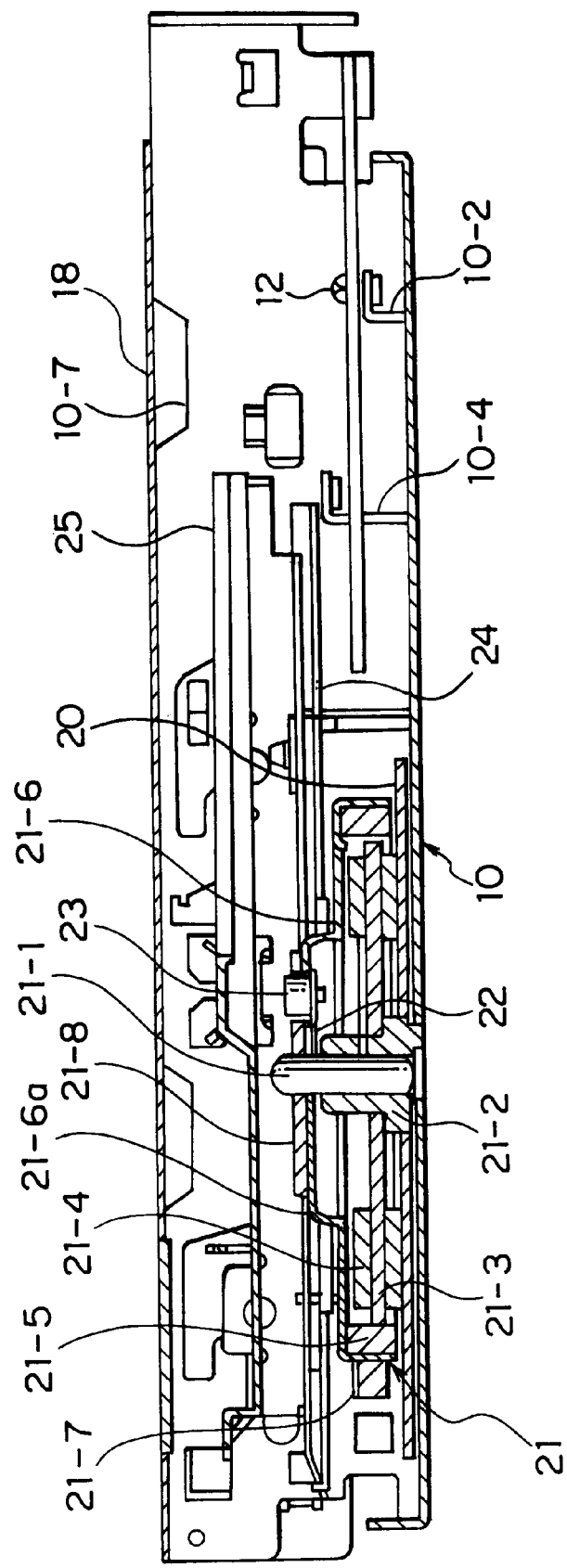
FIG. 3 is a cross sectional view taken on the line B–B' in FIG. 1.

The motor 40 has the same configuration as the motor 21 described in conjunction with FIG. 3. The motor 40 is comprised of a rotor 41 and a stator 42 assembled with the rotor 41. The rotor 41 has a metallic casing 41-1 having a shape of a circular plate. The casing 41-1 has a central cone 41-11 with a closed top that has a trapezoidal configuration in cross section and is projected upward at the center of the circular plate. A disk table 43 is fixed to the closed top surface of the central cone 41-11. The chassis 30 has an opening 30a formed therein through which only an upper portion of the central cone 41-11 with the closed top of the rotor 41 is projected towards the major surface. The disk table 43 is thus projected towards the major surface of the chassis 30.

A metallic rotation shaft 44 is integrally fixed to the rotor 41 at the center thereof such that the rotation shaft 44 passes through the casing 41-1 and the disk table 43. The casing 41-1 and the rotation shaft 44 are integrally assembled with each other during injection molding of the disk table 43 with plastic magnet. The casing 41-1 has a downwardly extending hollow cylindrical member 41-12 on the outer periphery thereof. A ring-shaped permanent magnet 45 is attached to an inner surface of the cylindrical member 41-12.

As described in conjunction with FIG. 3, the central cone 41-11 with the closed top is provided with an arm 46 on a bottom surface thereof. A drive roller 47 is rotatably mounted on the arm 46. The central cone 41-11 with the closed top and the disk table 43 have a generally rectangular hole formed therein. The drive roller 47 passes through the holes and projects upward from the disk table 43. The magnetic disk contained in the magnetic disk drive is mounted on the disk table 43. The drive roller 47 is inserted in and engaged with a hole formed in a hub of the magnetic disk. Consequently, the magnetic disk is rotation driven in response to the rotation of the rotor 41.

On the other hand, the stator 42 is attached to a back side of the chassis 30 by means of a metallic motor base plate 50. More specifically, the stator 42 is formed on a printed wiring board 51 mounted on the major surface of the motor base plate 50. The stator 42 comprises, as described in conjunction with FIG. 3, a plurality of stator cores 42-1, stator coils 42-2, and a bearing unit (center metal) 42-3. Each of the stator cores 42-1 extends radially from the center. The stator coil 42-2 is wound about an end of the corresponding core 42-1. The bearing 42-3 is for the rotation shaft 44 provided at the center of the printed wiring board 51. The motor base plate 50 has a plurality of reverse L-shaped attachment members 50-1 that extend upward from the edge of the motor base plate 50 and abut against the back surface of the chassis 30.

FIG. 5 shows only the chassis 30, the motor base plate 50, and the printed wiring board 51 of the components shown in FIG. 4. In FIGS. 5 and 6, the chassis 30 has side walls 30-1 on both sides thereof. The stator 42 of the motor 40 projects out of the back surface of the chassis 30. Thus, in this embodiment, the chassis 30 is provided with a casing 60 called a lower cover that is assembled therewith on the back side thereof. The casing 60 has side walls 60-1 on both sides thereof as in the chassis 30. The casing 60 is removably engaged with and fit to the outer surface of the side walls 30-1 on both sides of the chassis 30. The casing 60 is so designed that the major surface thereof is coplanar with the motor base plate 50 when assembled with the chassis 30. The casing 60 has an opening 60a formed therein at the position corresponding to the motor base plate 50.

Mount members 50-1 are provided (at two locations in this embodiment). The mount members are attached by the screws to the back surface of the chassis 30.

The motor base plate 50 may has a dish-shape that is adapted to cover the stator 42. The mount member may be provided along the entire circumference of it. In this case, the casing 60 may be omitted.

As described above, according to the present invention, the major surface of the chassis bears only the disk table exposed out of the rotation driving mechanisms for the magnetic disk. Therefore, the space on the major surface of the chassis can be used advantageously. In addition, the magnetic flux generated by a magnetic flux generation source can be prevented from being present over the major surface of the chassis to thereby eliminate any bad influence on the magnetic head. Furthermore, the opening formed in the chassis for receiving the motor can be held to a minimum size, so that the chassis is not suffered from reduction in mechanical strength.

What is claimed:

1. A disk drive comprising: a reception mechanism for receiving a disk on which data are recorded; an ejection mechanism for ejecting the disk that has been received; a carriage mechanism having a head unit for use in accessing the disk, said carriage mechanism holding said head unit such that said head unit is movable in a radial direction of said disk; a moving mechanism for moving said carriage mechanism; a disk table for holding and rotation driving said disk; and a drive motor for rotation driving said disk table, said reception mechanism, said ejection mechanism, said carriage mechanism, and said moving mechanism being all incorporated on a major surface of a metal metallic chassis, wherein said drive motor is comprised of a rotor formed of a circular plate and a stator assembled with said rotor, said rotor having a central cone with a closed top, said central cone with the closed top having a trapezoidal configuration in cross section and being projected upward at the center of said circular plate, said disk table being fixed to the closed top surface of said central cone, and wherein said chassis has an opening formed therein through which only an upper portion of said central cone with the closed top is projected towards said major surface, said disk table being projected towards the major surface of said chassis while said stator is mounted on a back side of said chassis.

2. A disk drive as claimed in claim 1, wherein a rotation shaft is integrally fixed to said rotor at a center thereof such that said rotation shaft passes through said rotor and said disk table, and said rotor has a downwardly extending hollow cylindrical member on the outer periphery of said circular plate, a ring-shaped permanent magnet being attached to an inner surface of said cylindrical member.

3. A disk drive as claimed in claim 2, further comprising a metallic motor base substrate, and a printed wiring board mounted on the major surface of said motor base substrate, to assemble said stator on the back side of said chassis, said stator having a plurality of stator cores mounted on said printed wiring board, said stator cores extending radially from the center; stator coils wound around the respective stator cores; and a bearing unit for said rotation shaft provided at the center of said printed wiring board, said motor base substrate having a plurality of reverse L-shaped attachment members that extend upward from the edge thereof and abut against the back surface of said chassis.

* * * * *